March 15, 1949.  L. G. YOUNG  2,464,662
DYNAMIC BALANCING MACHINE
Filed May 6, 1944  2 Sheets-Sheet 1

INVENTOR:
Leslie Gordon Young

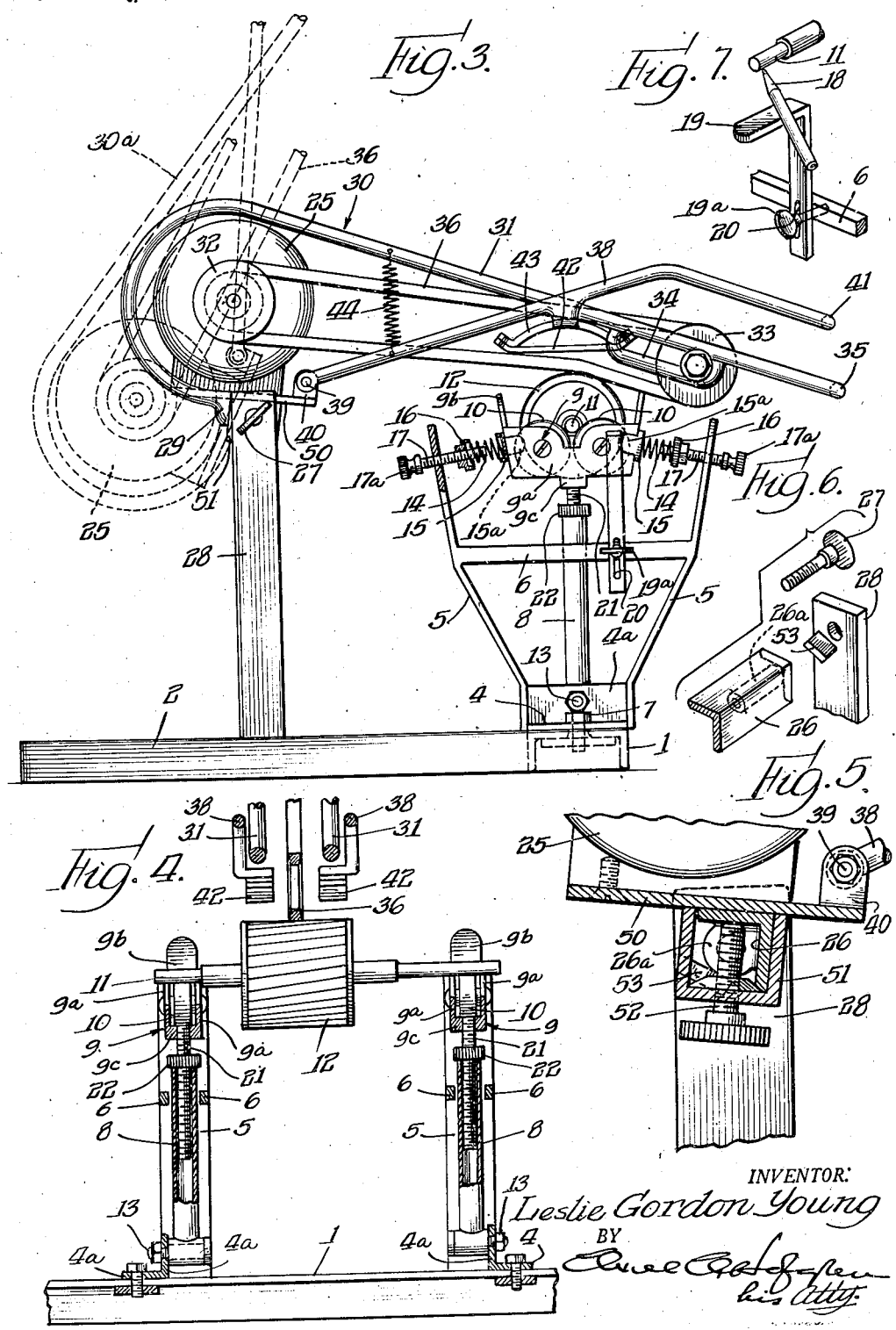

Patented Mar. 15, 1949

2,464,662

UNITED STATES PATENT OFFICE 2,464,662

DYNAMIC BALANCING MACHINE

Leslie Gordon Young, Chicago, Ill., assignor to Arthur Wagner Company, Chicago, Ill., a corporation of Illinois Application May 6, 1944, Serial No. 534,390

6 Claims. (Cl. 192—4)

1

This invention relates to balancing machines of the type designed for testing rotary members in running balance to locate and measure the amount of unbalance thereof, so that the parts may be properly marked for correction.

One object of the invention is to provide a new and improved balancing machine for testing rotary parts with respect to the running balance thereof.

Another object of the invention is to provide a balancing machine provided with means for rotatably supporting a rotary member to be tested and with means for frictionally engaging the same for initiating its rotation, said means being readily disengageable to permit free rotation of the part for testing purposes.

It is also an object of the invention to provide a balancing machine with anti-friction bearing members for temporarily supporting a rotary part to be tested, said bearings being vertically adjustable relative to each other so that the part may be supported with its axis of rotation horizontal, even though its journaled portions are not both of the same diameter.

A further object of the invention is to provide a balancing maching having a pair of upright supports with upwardly open anti-friction bearings thereon to receive journal portions of a rotary member to be tested and to arrange the anti-friction bearing units for pivotal adjustment about vertical axes to insure their proper alignment with the journals of the member.

More specifically it is an object of the invention to provide a balancing machine with upwardly open bearings to receive the journal portions of a rotary member to be tested and to arrange adjacent such bearings a driving motor with a frame extending therefrom and supporting an idler pulley for a belt driven by said motor, the frame being movably mounted for bringing the belt into frictional engagement with the member to be tested for initiating its rotation, after which the belt may be disengaged from the member to allow it to rotate freely; the frame carrying also a brake device adapted to be brought into contact with the rotary member for stopping it upon conclusion of the test.

Other objects and advantages of the invention will appear from the following description taken in connection with the drawings, in which—

Fig. 1 is a front elevation of a dynamic balancing machine embodying this invention, showing a rotary member such as a motor armature in position for testing and showing the driving belt

2 of the machine in engagement with the armature for initiating its rotation.

Fig. 3 is a side elevation of the machine with the driving belt shown engaging the rotary member to be tested.

Fig. 4 is a detail sectional view taken as indicated at line 4—4 on Fig. 2.

Fig. 5 is a detail section taken substantially as indicated at line 5—5 on Fig. 1, but on a larger scale.

Fig. 6 is a perspective view showing in disassembled relation certain of the parts seen in Fig. 5.

Fig. 7 is a perspective detail view indicating the method of marking a rotary part in the process of testing and balancing the same.

Figure 1:
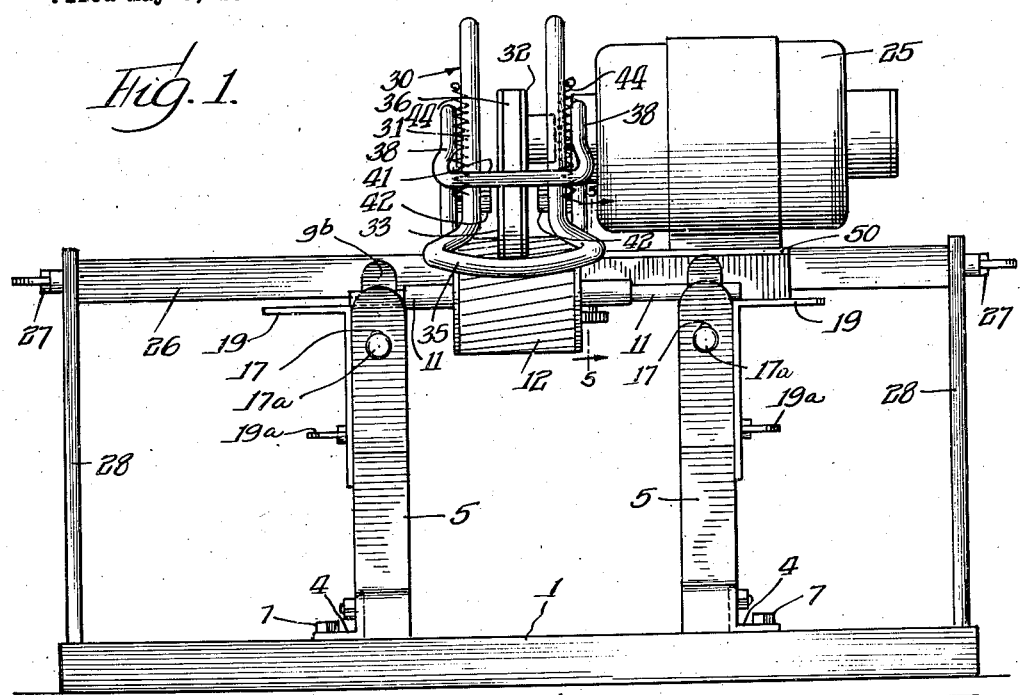

While the invention is susceptible of various modifications and alternative constructions, it is shown in the drawings and will be described hereinafter in a preferred embodiment, but it is not intended that the invention be limited thereby to the specific embodiment disclosed, but rather, it is intended to cover all modifications and alternative constructions falling within the spirit and scope of the appended claims.

A machine of this character is intended to facilitate testing various mechanical parts which are intended to rotate, at various speeds, when in use, as, for example, the armatures of motors or generators, pulleys, gears and various other similar machine elements. An armature is usually provided with its own shaft to which it is rigidly secured, and other elements such as gears or pulleys may be furnished with a temporary shaft or mandrel, if necessary, to adapt them to the balancing machine in which they are to be rotated to determine whether or not they are in true running balance.

As shown in the drawings the machine is provided with a supporting frame which includes a bed 1 with lateral frame members 2, 2 extending rearwardly therefrom and with a rear cross-member 3 connecting said members 2, 2. A pair of upright frames are secured to the bed in spaced relation to each other, said frames each comprising a base 4 with arms 5, 5 extending divergently upward therefrom and tied together by a cross-member 6. A clamping bolt 7 secures the base 4 frictionally and adjustably to the bed 1 so that the distance between the two vertical frames may be varied to accommodate rotary parts of various lengths. The base 4 is in the form of an angle member to the vertical flange 4a of which there is secured an upright support 8 which carries at its upper end a bracket structure 9 in which the anti-frictional rollers 10, 10 are journaled. These rollers form an upwardly open journal bearing for the shaft 11 of the rotary member, such as the armature 12, which is to be tested in the balancing machine. Preferably the rollers 10, 10 are carried on ball bearings so as to turn as freely as possible and offer a minimum of resistance to the rotation of the part 12 and its shaft 11. By reference to Fig. 4 it will be understood that the armature 12 or other rotary member is supported by lodgment of its shaft 11 or corresponding journal portions upon the two upwardly open bearings provided by the two pairs of rollers 10, 10 in the two upright frames which are secured to the bed 1 and which are spaced apart at a suitable distance to accommodate such armature 12 or similar element between them.

The upright support 8 is connected at its lower end to the base flange 4a by means of a pivot bolt 13 so that the upper end of the member 8 and the bearing bracket structure 9 carried thereby is capable of movement transversely of the axis of the shaft 11. This movement is yielding checked and limited by means of springs 14, 14 which react between spring pockets 15 on the bracket structure 9 and spring pockets 16 which are threaded for adjustment upon threaded studs 17 projecting inwardly from the arms 5, 5 of the upright frame. Thus, if the part 12 is not perfectly balanced, its rotation upon the bearing rollers 10, 10 will tend to set up some lateral vibration transversely of the axis of the part 12 and its shaft 11 which will be communicated to the rollers 10 and their bearing bracket structure 9, causing the latter to vibrate in a generally horizontal direction as permitted by the yielding of the springs 14, 14. When this occurs a suitable chalk or pencil 18 is held upon one of the rests 19 as shown in Fig. 7, in position to contact and mark a portion of the shaft 11 which is running eccentrically. The slot 20 of the rest member is engaged by a clamp screw 19a to permit adjustment of the rest. A rotary part such as the armature 12, if allowed to spin freely under its own momentum on the bearing rollers 10, 10, will tend to spin about its true center of gravity which may not coincide perfectly with the axis of the shaft 11. Chalk or pencil marks applied to the shaft as it thus rotates out of center will serve as guides for correcting the balance of the rotary part either by drilling or otherwise cutting away a portion thereof or by adding weights at proper positions to bring about a true running balance.

As shown, each of the bracket structures 9 in which the rollers 10, 10 are journaled comprises a pair of parallel side walls 9a, 9a and a pair of end walls 9b, 9b, with a mounting block or boss 9c secured between the side walls 9a, 9a and threaded for engagement with the upper end of a threaded rod 21 which telescopes removably within the upright support 8. A nut 22 on the rod 21 is seated upon the upper end of the hollow member 8 for adjusting the bracket structure 9 upwardly or downwardly with relation to the bed 1. This not only permits delicate adjustment of the bearing rollers 10 to insure that the shaft 11 of the rotary member shall be carried in true horizontal position, but it also permits the rollers of one vertical frame to be adjusted at a different height than the rollers of the other frame if it happens that the shafts or other journal portions of the rotary part are not both of the same diameter. For example, in most motors the armature shaft is of the same size at both ends of the armature, but this is not always so and it is desirable to be able to adjust one pair of rollers 10, 10 vertically to meet this situation. In order to increase the range in rotor sizes that may be dynamically balanced, other pairs of bearing brackets are provided, these pairs being interchangeable but of different strength and weight. The lighter pairs are for use on small or light weight rotors, thus increasing the sensitivity of the balancer.

To permit such vertical adjustment of the bracket structure 9 without distorting the springs 14, the spring pockets 15 are slidably engaged with the end walls 9b of the bracket structure, said pockets being provided with arms 15a which embrace the side walls 9a of the bracket structure, as shown in Fig. 3. The tension of the springs 14 may be varied by adjusting the pockets 16 along the threaded studs 17 so that if the vertical adjustment of the bracket structure 9 should be such as to materially alter the pressure of the springs 14, this can be readily readjusted by means of the threaded pockets 16. It will be understood that it is desirable to vary the strength of the springs 14 in accordance with the mass of the rotary element under test so that an unusually heavy part will not cause excessive vibration of the bearing brackets 9 and so that for a relatively light mass the tension of the springs 14 may be reduced to insure that the resulting vibration will be appreciable and measurable if the part is not in true running balance. It is also desirable to positively limit the lateral range of movement of the bracket 9 on its pivoted support 8, and for this purpose the studs 17 are screwed into the parts 5 and may be adjusted therein by turning their heads 17a.

Figure 2:
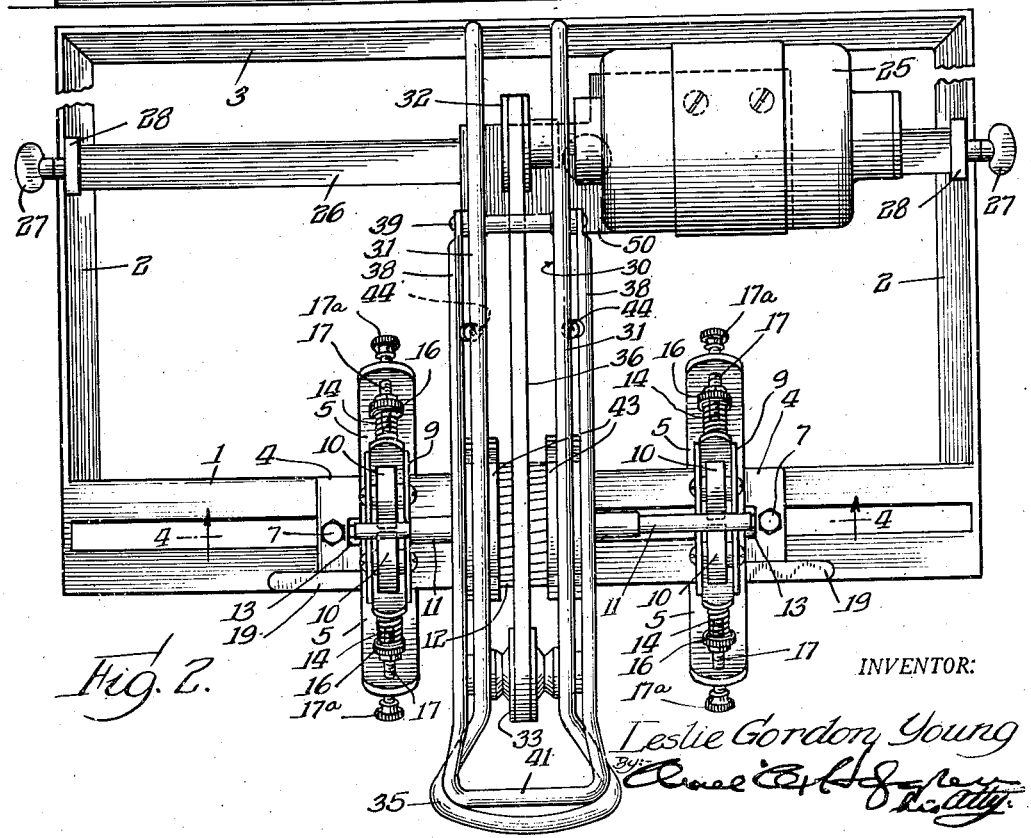
Fig. 2 is a top plan view of the machine shown in Fig. 1.

For initiating the rotation of a part to be tested there is provided a driving motor 25 mounted upon a supporting bar 26 which is pivotally carried by trunnion screws 27 extending into opposite ends of the bar 26 and through the upper ends of posts 28 which rise from the frame members 2, 2. A bent frame 30 of rod stock is anchored to a channel member 51 at 29 (which channel member is hereinafter more fully described as embracing the bar 26, as shown best in Fig. 5). The bent frame 30 includes curved portions and handle portions 31 which extend parallel to each other as indicated in Fig. 2. A driving pulley 32 on the shaft of the motor 25 is disposed in a plane between the two handle arms 31, 31 of the frame 30, and an idler pulley 33 is mounted with its shaft secured in slotted brackets 34 attached to the arms 31, 31. Said arms are united adjacent the pulley 33 by the bail portion 35 serving as a hand grip by which the motor and the frame 30 may be tilted at will about the trunnions 27. An endless belt 36 is trained over the pulleys 32 and 33. With the motor 25 driving this belt, the frame 30 is rocked downwardly so as to bring the belt into frictional engagement with the rotary element, such as the armature 12, which is to be tested. Fig. 3 shows the belt 36 thus engaging the armature 12 for initiating its rotation. When sufficient speed has been acquired by the rotary member, the frame 30 is rocked upwardly and may be tilted back to a position of rest, indicated in dotted lines at 30a in Fig. 3, in which position the motor 25 may be left running or may be shut off by any suitable automatic switching device, not shown.

The rests 19 already mentioned are attached to both of the upright frames, so that both ends of the shaft 11 of the rotary element can be conveniently marked. When this has been done the rotation is quickly stopped by means of a brake attachment. The length and position of the shaft marks will indicate where weights must be attached in order to reduce vibration. This operation of rotating, marking and stopping the member under test is repeated until a more perfect balance is obtained. The brake comprises a pair of lever arms 38 fulcrumed at 39 to supporting lugs 40 extending from the plate 50 which carries the motor 25. These arms 38 are shown straddling the arms 31 and their outer ends are connected by a cross-bar 41 serving as a handle. Brake shoes 42, preferably composed of leather straps or like material, are stretched from the ends of arcuate supports 43 which are attached to the lever arms 38 directly over the position of the rotary part 12 when supported on the bearing rollers 10. Normally the springs 44 hold the brake shoes 42 elevated somewhat above the level of the lower ply of the belt 36, but by moving the handles 35 and 41 towards each other (which movements may readily be accomplished by grasping both handles in one hand and squeezing them together) the operator can lower the brake shoes 42 below the bottom run of the belt 36 and in position for use, so that as the frame 30 is then swung downwardly (while handles 35 and 41 are held together) said brake shoes will encounter the spinning part 12 and arrest its rotation. Then as the frame 30 is swung upwarddly out of the way, the part 12 may be removed from the machine for such treatment as may be indicated to correct its running balance.

In order that the position of the belt 36 and brake shoes 42 may be varied to register with armatures or other objects to be tested which may be of different sizes or differently located on their own shafts, the motor 25 and belt-supporting frame 30 are mounted on the bar 26 for sliding adjustment along it. The motor-supporting base plate 50 has rigidly secured to its under side a channel member 51 which embraces the angle bar 26 as shown in Fig. 5. A clamp screw 52 having threaded engagement with the channel member impinges against the horizontal flange of the angle bar 26 to hold the motor assembly at any position to which it may be adjusted along the bar 26. The trunnion screws 27 engage in threaded tubular members 26a which may be brazed or welded to the angle bar 26 at its ends; and the posts 28 carry stop lugs 53 to limit the tilting of the motor 25 and frame 30 at the position shown in dotted lines in Fig. 3. At this position the motor overbalances the frame and acts as a counterweight to hold the assembly in this inoperative or non-driving position until it is again swung down into the position shown in full lines.

It should be noted that the threaded stems 21 by which the bearing brackets 9 are carried in the tubular uprights 8, are not only adjustable vertically therein, but are fitted with sufficient clearance in the bores of the members 8 so that each bearing bracket can swivel about the vertical axis of its stem 21. This permits the rollers 10 to align themselves with the journal portions, such as the ends of the shaft 11, of the rotary body 12 at all times. If it proves that the rotary body is out of balance to a greater extent at one end than at the other end, one of the bearing brackets 9 and its rollers 10 will be vibrated transversely through a larger amplitude than the other bracket, but said other bracket, being mounted to swivel about the vertical axis of its stem 21, can maintain proper alignment with the more widely swinging bearing bracket, thus avoiding any cramping action or excessive friction against the shaft or journals of the body under test.

Thus the machine is not only adjustable to receive a wide range of rotary elements for testing them as to running balance, but it is adapted to accommodate itself automatically to various conditions which may be encountered and to respond delicately and accurately for indicating any correction which may be required.

I claim as my invention:

1. In a machine adapted to support a rotary body rotatably on a horizontal axis: frictional driving means movable at will into and out of driving engagement with the rotary body, comprising a motor with a driving pulley, an idler pulley, an endless belt traversing said pulleys and a frame supporting said motor and pulleys with the lower ply of the belt extending transversely over the axis of rotation of the rotary body for driving contact with said body, said frame being pivotally supported upon a horizontal axis adjacent the motor and including a handle portion at its forward end by which the frame may be swung upwardly about its pivot to disengage the belt from the rotary body, such upward movement carrying the motor downwardly around the axis of the frame pivot to a position at which it acts as a counterweight upholding the frame with said belt disengaged from the rotary body, and stop means limiting said movement of the frame and belt at such position.

2. In a testing machine adapted to support a rotary body for rotation about a horizontal axis with said body resting substantially freely on upwardly open bearings arranged to permit ready removal of said body from said machine: frictional driving means movable at will into driving engagement with the top portion of said rotary body and movable at will out of engagement therewith to an out of the way position permitting access to said body from the top and permitting removal of said body from said machine, comprising a motor driven shaft equipped with a driving pulley, an idler pulley, an endless belt traversing said pulleys, and a rockably mounted frame positioned above the level of said bearings and pivoted to the rear thereof and supporting said motor driven shaft and said pulleys so that the belt extends forwardly therefrom and over the rotary body, said frame being tiltable to position the belt in driving contact with said top portion of the rotary body and to disengage said belt therefrom to permit free rotation of said body on said bearings, the rockable mounting of said frame including a bar extending parallel to the axis of the rotary body and means by which said frame is mounted on said bar for slidable adjustment along it to position said belt for engaging the rotary body.

3. In a machine adapted to support a rotary body for rotation about a horizontal axis on upwardly open bearings arranged to permit ready removal of said body from said machine: frictional driving means and brake means both movable at will into driving engagement with the top of said rotary body and movable at will out of engagement therewith to an out of the way position permitting access to said body from the top and permitting removal of said body from said machine, comprising a motor driven shaft equipped with a driving pulley, an idler pulley, an endless belt traversing said pulleys, a rockably mounted frame supporting said motor driven shaft and said pulleys, said frame being tiltable to position the belt in driving contact with the rotary body and to disengage said belt therefrom to permit free rotation of said body on said bearings, a frame member pivotally mounted on said frame, a friction brake shoe carried by said frame member adjacent the portion of said belt which engages said rotary body, means normally urging the frame member to a position where the brake shoe is above the body-contacting portion of the belt when the belt engages the body, and means for rotating the frame member and forcing the brake shoe into position below the belt for contact with said body and simultaneously locating the belt above the brake shoe where it cannot contact said body, said body being supported on said bearings during both the driving and braking contacts.

4. In a machine adapted to support a rotary body for rotation about a horizontal axis on upwardly open bearings arranged to permit ready removal of said body from said machine: frictional driving means normally positioned above said body and movable at will into and out of engagement with the rotary body to drive said body while it is supported on said open bearings, comprising a motor equipped with a driving pulley, an idler pulley, an endless belt traversing said pulleys, a rockably mounted frame supporting said motor and said pulleys, said frame being tiltable to position the belt in driving contact with the top of the rotary body and to disengage said belt therefrom, a lever pivoted on said frame, a brake shoe carried by said lever at a position adjacent said belt, spring means reacting between the frame and the lever to hold the brake shoe normally at inoperative position above the lower run of the belt in an out of the way position when the belt engages the body, and means for turning said lever about its pivot to force the brake shoe into position below said lower run of the belt for contact with said body with said lower run being out of position for engagement with said body, said body being supported on said bearings during both the driving and braking contacts.

5. In a testing machine adapted to support a rotary body for rotation about a horizontal axis on upwardly open bearings arranged to permit ready removal of said body from said machine: frictional driving means normally positioned above said body and out of engagement therewith to permit ready removal of said body from said machine and movable at will into engagement with the top of the rotary body to drive said body while it is supported on said open bearings, said driving means comprising a motor with a driving pulley, an idler pulley, an endless belt traversing said pulleys, a frame supporting said motor and pulleys with the lower ply of the belt extending transversely over the axis of rotation of the rotary body for driving contact with said body, said frame being pivotally supported upon a horizontal axis adjacent the motor and including a handle portion at its forward end by which the frame may be swung downwardly about its pivot to engage the belt with the top of the rotary body, a lever pivoted on said frame and having an operating handle at its forward end located closely adjacent and above the handle portion of the frame, a brake shoe carried by said lever at a position normally above the lower run of said belt in an out of the way position to permit removal of said body from said machine, and spring means between the frame and the lever normally holding the brake shoe at such inoperative position above the lower run of the belt, said lever being movable upon its pivot to shift the brake shoe below the lower run of the belt to operative position for contact against said body by grasping said handle portion of the frame and handle of the lever and moving them together, said brake shoe being then in position where contact of said belt with said body is prevented by the position of the brake shoe.

6. In a machine adapted to support a rotary body for rotation about a horizontal axis on upwardly open bearings arranged to permit ready removal of said body from said machine: frictional driving means movable into and out of driving engagement with the rotary body, comprising driving and idler pulleys, an endless belt traversing said pulleys, means for supporting said pulleys including a frame rockably mounted adjacent one end thereof and carrying the idler pulley adjacent the other end thereof, said frame being tiltable to position the belt in driving contact with the rotary body while said body is supported upon said bearings and to disengage the belt therefrom to permit free rotation of said body, easy access thereto and ready removal of said body from said machine, a handle on the end of said frame adjacent said idler pulley, a friction brake shoe, means for movably supporting said brake shoe adjacent the portion of said belt which engages said rotary body and normally positioned above said portion of the belt and for movement with and relative to said portion of the belt, said last-named means having a handle positioned adjacent and above the handle on said frame, said handles being capable of being readily grasped to move them together and force the brake shoe below the belt to a position where contact of the belt with said body is prevented by the position of the brake shoe, said brake shoe thereupon being in position for engagement with the top of the rotary body while said body remains supported on said bearings.

LESLIE GORDON YOUNG.

REFERENCES CITED

The following references are of record in the file of this patent:

UNITED STATES PATENTS

| Number | Name | Date |
|---|---|---|
| 59,256 | Parker | Oct. 30, 1866 |
| 598,107 | Moody | Feb. 1, 1898 |
| 848,870 | Weller | Apr. 2, 1907 |
| 1,009,323 | Lincoln et al. | Nov. 21, 1911 |
| 1,292,280 | Ekstrom | Jan. 21, 1919 |
| 1,447,985 | Hutchinson | Mar. 13, 1923 |
| 1,481,785 | Akimoff | Jan. 29, 1924 |
| 1,546,030 | Schmidt | July 14, 1925 |
| 1,699,834 | Dieckmann | Jan. 22, 1929 |
| 1,797,269 | Lundgren | Mar. 24, 1931 |
| 2,043,618 | Havill | June 9, 1936 |
| 2,174,665 | Livingston | Oct. 3, 1939 |
| 2,186,339 | Moore | Jan. 9, 1940 |
| 2,211,779 | Holmes | Aug. 20, 1940 |
| 2,289,200 | Lundgren | July 7, 1942 |
| 2,319,655 | Bennet | May 18, 1943 |
| 2,329,654 | Rouy | Sept. 14, 1943 |